(12) United States Patent
Kulkarni et al.

(10) Patent No.: US 11,882,491 B2
(45) Date of Patent: Jan. 23, 2024

(54) UE-CONTROLLED SELECTION BETWEEN INTER-RAT HANDOVER AND INTER-RAT DUAL CONNECTIVITY

(71) Applicant: T-Mobile USA Inc., Bellevue, WA (US)

(72) Inventors: Atul Kulkarni, Brambleton, VA (US); Sreekar Marupaduga, Overland Park, KS (US); Sougata Saha, Overland Park, KS (US); Anurag Thantharate, Overland Park, KS (US)

(73) Assignee: SPRINT SPECTRUM LLC, Bellevue, WA (US)

( * ) Notice: Subject to any disclaimer, the term of this patent is extended or adjusted under 35 U.S.C. 154(b) by 113 days.

(21) Appl. No.: 17/248,523

(22) Filed: Jan. 28, 2021

(65) Prior Publication Data

US 2022/0240145 A1    Jul. 28, 2022

(51) Int. Cl.
*H04W 36/08*    (2009.01)
*H04W 76/15*    (2018.01)

(52) U.S. Cl.
CPC .......... *H04W 36/08* (2013.01); *H04W 76/15* (2018.02)

(58) Field of Classification Search
CPC .............................. H04W 36/08; H04W 76/15
See application file for complete search history.

(56) References Cited

U.S. PATENT DOCUMENTS

| 11,432,183 B1* | 8/2022 | Marupaduga | ......... H04W 76/15 |
| 11,457,382 B1* | 9/2022 | Pawar | ................... H04W 28/24 |
| 2016/0345231 A1* | 11/2016 | Moon | ................... H04W 36/32 |
| 2019/0373520 A1 | 12/2019 | Sillanpaa | |
| 2020/0367215 A1 | 11/2020 | Futaki et al. | |
| 2022/0078687 A1* | 3/2022 | Zhu | ................... H04W 36/0058 |

FOREIGN PATENT DOCUMENTS

WO    2020/199228 A1    10/2020

OTHER PUBLICATIONS

International Search Report and Written Opinion dated Apr. 18, 2022, in corresponding International Application No. PCT/US22/13173, filed Jan. 20, 2022, 7 pages.

* cited by examiner

*Primary Examiner* — Justin Y Lee
(74) *Attorney, Agent, or Firm* — Lee & Hayes P.C.

(57) ABSTRACT

A method and system for dynamically controlling connectivity of a user equipment device (UE) when the UE has standalone connectivity with a first access node under a first radio access technology (RAT). An example method includes the UE detecting that the UE is within threshold strong coverage of a second access node under a second RAT, and the UE making a selection between (i) responsively handing over from the first access node to the second access node and (ii) having dual-connectivity with the first access node and the second access node. Further, the example method includes the UE informing the first access node of the UE's selection, perhaps together with an inter-RAT measurement report reporting that the UE is within threshold strong coverage of the second access node, and the first access node responsively taking action in accordance with the UE's selection.

19 Claims, 5 Drawing Sheets

UE-CONTROLLED SELECTION BETWEEN INTER-RAT HANDOVER AND INTER-RAT DUAL CONNECTIVITY

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

The coverage provided by a given access node on a given carrier could also be considered to define a respective "cell". Thus, if an access node provides coverage and service on two carriers, the access node would be providing two cells, one on each carrier. And if two access nodes provide coverage and service on the same carrier as each other, the access nodes would be providing different respective cells than each other, both on the same carrier.

On the downlink and uplink, the coverage of each such cell could define an air interface configured in a specific manner to provide physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random access signaling from UEs to the access node, and other resource elements could be reserved to carry other control signaling such as PRB-scheduling requests, acknowledgement messaging, and channel-quality reports from UEs to the access node.

OVERVIEW

When a UE enters into coverage of such a system, the UE could detect threshold strong coverage of an access node on a carrier, such as by detecting threshold strong reference signal receive power (RSRP) from the access node on that carrier. And the UE could then engage in random-access and connection signaling, such as Radio Resource Control (RRC) signaling, with the access node to establish an air-interface connection (e.g., RRC connection) through which the access node will then serve the UE on that carrier. Further, the access node could establish in data storage a context record for the UE, noting the carrier on which the UE is connected and noting associated service information.

In addition, if the UE is not already registered for service with the core network, the UE could transmit to the access node an attach request, which the access node could forward to a core-network controller for processing. And the core-network controller and access node could then coordinate setup for the UE of one or more user-plane bearers, each of which could include (i) an access-bearer portion that extends between the access node and a core-network gateway system that provides connectivity with a transport network and (ii) a data-radio-bearer portion that extends over the air between the access node and the UE.

Once the UE is connected and registered, the access node could then serve the UE in a connected or active mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

In addition, the access node might provide the UE with carrier-aggregation service, where the access node serves the UE on a combination of multiple carriers at once, to help provide the UE with increased peak data rate of communication. In an example carrier-aggregation implementation, the multiple carriers on which the access node serves the UE would define a "cell group" including a primary cell (PCell) or primary component carrier (PCC) and one or more secondary cells (SCells) or secondary component carriers (SCCs). To configure carrier-aggregation service when the UE initially connects with the access node or later, the access node could add one or more carriers to the UE's connection, recording the group of carriers in the UE context record and signaling to the UE to prepare the UE to operate accordingly.

When a UE is connected with an access node under a given RAT, the UE may also monitor for the presence of coverage under another RAT, to help ensure that the UE is served with the most optimal available coverage. Without limitation, this could be useful in a scenario where the industry supports both a legacy RAT and a newer and possibly technically-superior RAT, such as both 4G LTE to 5G NR for instance, and where the UE is currently connected under the legacy RAT but also supports service under the newer RAT.

In practice, for instance, when the UE is connected under a first RAT with a first access node, the UE may be configured to monitor for the occurrence of an inter-RAT measurement event, i.e., a "B1" measurement event, where the UE detects threshold strong coverage of a second access node under a second RAT. And upon detecting that threshold strong coverage, the UE could transmit to the first access node a B1 measurement report specifying the detected second-RAT coverage.

When the first access node receives from its served UE a B1 measurement report, the first access node could respond by either coordinating an inter-RAT handover of the UE or establishing inter-RAT dual connectivity for the UE.

With inter-RAT handover, for instance, the first access node might engage in handover signaling with the second access node, and the first access node could transmit to the UE a release-and-redirect command that directs the UE release the UE's first-RAT connection with the first access node and to instead acquire a second-RAT connection with the second access node. In response to this release-and-redirect command, the UE may therefore discontinue service under its first-RAT connection and instead engage in signaling such as described above to establish a second-RAT connection with the second access node.

With inter-RAT dual connectivity, on the other hand, the first access node could maintain its first-RAT connection with the UE and could coordinate establishment for the UE of a co-existing second-RAT connection between the UE and the second access node, as well as setup of a split bearer to enable the first and second access nodes to concurrently serve the UE. For instance, the first access node, operating as a master node (MN) for the dual connectivity, could engage in signaling with the UE and with the second access node, as a secondary node (SN), to coordinate setup of the second-RAT connection for the UE on one or more second-RAT carriers defining a secondary cell group (SCG). And the first access node could engage in signaling with the core-network controller and the second access node to arrange for setup of the split bearer, so that the first and second access nodes could serve respective portions of the UE's data communication.

A technical question in this situation could be which of these two processes the UE's serving access node should carry out in response to receipt of a B1 measurement report from the UE. Namely, when a UE has a first-RAT connection with a first access node and the first access node receives from the UE a measurement report indicating that the UE is within threshold strong coverage of a second access under a second RAT, at issue could be whether the serving access node should hand over the UE from the first-RAT connection with the first access node to a second-RAT connection with the second access node or, rather, should add for the UE a co-existing second-RAT connection with the second access node so that the UE could be served with inter-RAT dual connectivity.

Assuming the UE has reasonably good coverage of the first access node in this situation, it would seem that the most reasonable approach would be to configure inter-RAT dual connectivity for the UE, as that dual connectivity may help provide the UE with increased peak data rate by multiplexing the UE's communications over the co-existing first-RAT and second-RAT connections.

But there may be various extenuating factors known to the UE that may justify taking the other approach instead. Without limitation, two examples of such extenuating factors are (i) where standalone second-RAT connectivity with the second access node would support higher quality service than inter-RAT dual connectivity with the first and second access nodes and (ii) where the UE's remaining battery energy is particularly low.

An example situation where standalone second-RAT connectivity with the second access node may support higher quality service than inter-RAT dual connectivity with the first and second access nodes is where the UE would be attached with a technically-superior core network when served with standalone second-RAT connectivity by the second access node than when served with inter-RAT dual connectivity by the first and second access nodes.

This could be the case where the first and second access nodes default to using different core networks than each other. For instance, the first access node may operate by default on a first core network, so that the UE would attach with that first core network upon connecting with the first access node, and that attachment with the first core network would remain even when the first access node adds for the UE the co-existing second-RAT connection with the second access node. Whereas, the second access node may operate by default on a technically-superior second core network, which might support higher quality of service for served UEs, and so if the UE were to acquire standalone second-RAT connectivity with the second access node (e.g., with a release-and-redirect as described above), the UE would newly attach with that second, technically-superior core network.

Particularly in a scenario where the second core network provides service-level support for types of applications or services that are installed on the UE and possibly running on the UE, the UE may benefit in this or another such situation by engaging in inter-RAT handover from the first access node to the second access node, rather than having operating with inter-RAT dual connectivity.

The other example extenuating factor that could justify the UE engaging in inter-RAT handover rather than receiving inter-RAT dual connectivity is where the UE is battery powered and the UE's remaining battery energy is particularly low. Operating with inter-RAT dual-connectivity could require the UE to operate two radios and associated RF transmit/receive chains concurrently, one respectively for each RAT, which could accelerate the UE's battery-energy drain. And this increased battery drain may ultimately lead to the UE disabling certain services, losing connectivity, or possibly shutting down altogether. Therefore, in a scenario where the UE's remaining battery energy is threshold low, the UE may likewise benefit by engaging in inter-RAT handover from the first access node to the second access node rather than operating with inter-RAT dual connectivity.

The present disclosure provides a technological mechanism that enables a UE to exert some control over which of approach the UE's serving access node will take when the UE provides the serving access node with a B1 measurement report.

In accordance with the disclosure, when the UE is served by a first access node under a first RAT and the UE detects threshold strong coverage of a second access node under a second RAT, the UE will make a selection between at least (i) engaging in inter-RAT handover from the first access node to the second access node and (ii) operating with inter-RAT dual connectivity by the first RAT and the second RAT, and the UE will inform the UE's serving first access node of the UE's selection, causing the access node to take action in accordance with the UE's selection. For instance, the UE could include within a B1 measurement report to the first access node a specification of the UE's selection between these two approaches, and the first access node could respond to that selection by acting accordingly.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G LTE access node (e.g., 4G evolved Node-B (eNB)) functions as the MN, and a 5G NR access node (e.g., 5G next-generation Node-B (gNB)) functions the SN. Thus, a UE could first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations, including possibly a single-RAT dual-connectivity arrangement. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
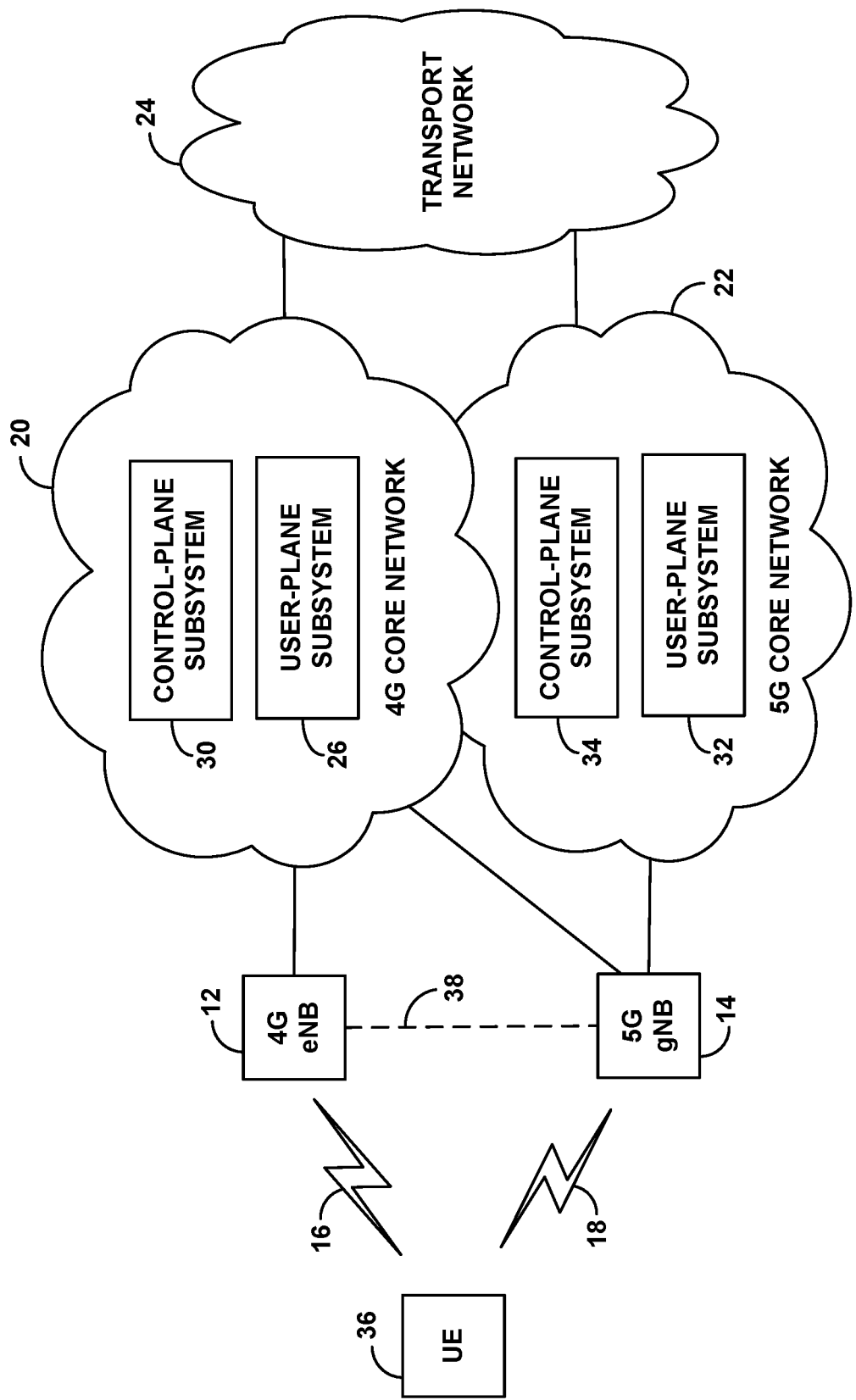
FIG. 1 is a simplified block diagram of an example network arrangement in which features of the present disclosure can be implemented.

Referring to the drawings, FIG. 1 is a simplified block diagram of an example network arrangement having a 4G eNB 12 and a 5G gNB 14. These access nodes could be macro access nodes of the type configured to provide a wide range of coverage or could take other forms, such as small cell access nodes, relays, femtocell access nodes, or the like, possibly configured to provide a smaller range of coverage. Further, the access nodes could be collocated with each other, e.g., at a common cell site with collocated RF points of origin, or could be separately located. Either way, the access nodes could be optimally configured to provide overlapping coverage in order to support EN-DC service.

In the example illustrated, the 4G eNB 12 is configured to provide 4G coverage and service on at least one 4G carrier 16, and the 5G gNB 14 is configured to provide 5G coverage and service on at least one 5G carrier 18. To facilitate providing service and coverage on the illustrated carriers, the access nodes could have a respective antenna structures, such as an antenna array, that is configured to transmit and receive electromagnetic signals in a region defined by an antenna pattern or radiation pattern, or the access nodes could share portions of a common antenna array for this purpose. And the access nodes could include other communication equipment, such as baseband units, radio heads, power amplifiers, and the like.

The air interface on each of these carriers could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown in FIG. 1, the example arrangement includes two core networks, designated as a 4G core network 20 and a 5G core network 22, each providing connectivity with an external transport network 24 such as the Internet for instance.

Each of these core networks could be a packet-switched network supporting virtual-packet tunnels or other interface between network nodes. And each network could both a user-plane subsystem through which UE bearer communications could flow to and from the transport network 24, and a control-plane subsystem supporting functions such as UE authentication, mobility management, and bearer management, among others. In particular, the 4G core network 20 is shown including a user-plane subsystem 26 and a control-plane subsystem 28, and the 5G core network 22 is shown including a user-plane subsystem 30 and a control-plane subsystem 32. The 4G and 5G core networks, however, may differ from each in various ways, with the 5G core network offering certain advantages. For instance, the 5G core network 22 may provide greater separation of control-plane and user-plane functions and may facilitate advanced slicing or other options that offer improved quality of service and other benefits compared with the 4G core network 20.

In the example arrangement shown, both the 4G eNB 12 and 5G gNB 14 are interfaced with the 4G core network 20, but of those two access nodes, just the 5G gNB 14 is interfaced with the 5G core network 22. In practice, the 4G core network 20 would be the core network for UEs served with standalone 4G connectivity by the 4G eNB 12 and for UEs served with EN-DC by the 4G eNB 12 as MN and the 5G gNB 14 as an SN. Whereas, the 5G core network 22 would be the core network for UEs served with standalone 5G connectivity by the 5G gNB 14.

In practice, the 5G gNB 14 could broadcast a system information message that indicates the 5G gNB's support for the 5G core network 22. For instance, the 5G gNB 14 could broadcast a system information block (SIB) message or master information block (MIB) message that includes an "N1-node support" value indicating 5G-core-network support. A UE within coverage of the 5G gNB 14 could thus determine by reading that message that the 5G gNB 14 supports connectivity with the 5G core network 22 and therefore that if the UE acquires standalone 5G connectivity with the 5G gNB 14, the UE would be served by the 5G core network. Alternatively, a UE could make this determination in other ways, such as based on a past instance of the UE having connected with the 5G gNB 14 for instance.

FIG. 1 illustrates an example UE 36 within coverage of both the 4G eNB 12 and the 5G gNB 14. This UE could take any of the forms noted above among other possibilities. And the UE could be equipped with both a 4G LTE radio and a 5G NR radio and include associated circuitry and logic that enables the UE to engage in standalone 4G LTE service, standalone 5G NR service, and EN-DC service. Further, in line with the discussion above, the 4G eNB 12 could be configured to support providing this UE with standalone 4G service using 4G core network 20, the 4G eNB 12 and 5G gNB 14 could be configured to support providing the UE with EN-DC service also using the 4G core network 20, and the 5G gNB 14 could be configured to support providing the UE with standalone 5G service using the 5G core network 22.

In an example implementation, when the UE is within coverage of this system, the UE may acquire standalone connectivity with either the 4G eNB 12 or the 5G gNB 14. The choice of which access node the UE would connect with could depend on various factors, such whether the UE is set to prefer one RAT over the other and/or which access node provides stronger coverage, among other possibilities.

If the UE discovers threshold strong coverage of the 5G gNB 14 on a 5G carrier 18 and decides to connect with the 5G gNB 14, then the UE could responsively engage in random access and RRC signaling with the 5G gNB 14 to establish a 5G connection between the UE and the 5G eNB 14 on that 5G carrier 18. And once the UE is connected with the 5G gNB 14, the UE could then transmit to the 5G eNB 14 an attach or registration request message, which the 5G gNB 14 could forward to the control-plane subsystem 34 of the 5G core network 22 for processing. And upon authenticating and authorizing the UE for service, the control-plane subsystem 34 and the 5G gNB 14 could coordinate setup for the UE of at least one user-plane bearer through the user-plane subsystem 32 of the 5G core network 22, likewise enabling the UE to communicate on transport network 24.

As noted above, the 5G core network could be configured with multiple "slices." Each of these slices could effectively define a logical/virtual network layer that has an associated service level to meet particular quality-of-service requirements such as low latency (e.g., by using edge computing that puts certain application services closer to the 5G gNB 14), high speed, etc., with each of various slices having a standard Network Slice Selection Assistance Information (NSSAI) identifier. In practice, when a UE registers with the 5G core network 22, the UE and the 5G core network 22 (e.g., the control-plane subsystem 34 of the 5G core network 22) could exchange information about what slices they respectively support (e.g., with the UE's slice support being based on what applications or the like are installed on, and possibly running on, the UE), to reach agreement on a common set of supported slices that the 5G core network would then make available for use to serve the UE.

Once the UE is connected with the 5G gNB 14 and registered with the 5G core network 22, the 5G gNB 14 could then serve the UE in a standalone 5G mode with wireless packet-data communications as noted above. For instance, when the user-plane subsystem 32 of the 5G core network 22 receives data from the transport network 24 for transmission to the UE, that data could flow via the UE's bearer to the 5G gNB 14, and the 5G gNB 14 could coordinate transmission of that data from the 5G gNB 14 to the UE on downlink PRBs of the 5G carrier 18 of the UE's 5G connection. And when the UE has data for transmission on the transport network 24, the UE could transmit a scheduling request to the 5G gNB 14, the 5G gNB 14 could coordinate transmission of that data from the UE to the 5G gNB 14 on uplink PRBs of the 5G carrier 18, and the data could then flow via the UE's access bearer through the user-plane subsystem 32 of the 5G core network 20, for output on the transport network 24.

On the other hand, if the UE discovers threshold strong coverage of the 4G eNB 12 on a 4G carrier 16 and decides to connect with the 4G eNB 12, then the UE could responsively engage in random access and RRC signaling with the 4G eNB 12 to establish a 4G connection between the UE and the 4G eNB 12 on that 4G carrier 16. Once the UE is connected with the 4G eNB 12, the UE could then transmit to the 4G eNB 12 an attach or registration request message, which the 4G eNB 12 could forward to the control-plane subsystem 30 of the 4G core network 20 for processing. And upon authenticating and authorizing the UE for service, the control-plane subsystem 30 and the 4G eNB 12 could coordinate setup for the UE of at least one user-plane bearer through the user-plane subsystem 26 of the 4G core network 20, enabling the UE to communicate on transport network 24.

Once the UE is connected with the 4G eNB 12 and registered with the 4G core network 20, the 4G eNB 12 could then serve the UE in a standalone 4G mode with wireless packet-data communications as noted above. For instance, when the user-plane subsystem 26 of the 4G core network 20 receives data from the transport network 24 for transmission to the UE, that data could flow via the UE's bearer to the 4G eNB 12, and the 4G eNB 12 could coordinate transmission of that data from the 4G eNB 12 to the UE on downlink PRBs of the 4G carrier 16 of the UE's 4G connection. And when the UE has data for transmission on the transport network 24, the UE could transmit a scheduling request to the 4G eNB 12, the 4G eNB 12 could coordinate transmission of that data from the UE to the 4G eNB 12 on uplink PRBs of the 4G carrier 16, and the data could then flow via the UE's access bearer through the user-plane subsystem 26 of the 4G core network 20, for output on the transport network 24.

When the UE has standalone 4G connectivity with the 4G eNB 12, the UE could also monitor for the presence of 5G coverage, perhaps in response to a directive from the 4G eNB 12 for the UE to do so. For instance, the 4G eNB 12 may transmit to the UE an RRC message carrying a B1 measurement object that specifies 5G carrier 18 and an associated B1 measurement threshold. The UE could then responsively scan for 5G coverage on the specified carrier and, upon detecting that reference signal strength on that carrier is at least as high as the specified B1 measurement threshold, the UE could transmit to the 4G eNB 12 an RRC message carrying a B1 measurement report indicating the threshold strong detected 5G coverage.

As noted above, in response to receiving a B1 measurement report from the UE, the 4G eNB 12 could either coordinate inter-RAT handover of the UE or coordinate establishment of inter-RAT dual connectivity for the UE. In particular, in this scenario, the 4G eNB 12 could either (i) coordinate handover of the UE from being served with standalone 4G connectivity by the 4G eNB 12 to being served instead with standalone 5G connectivity by the 5G gNB 14 or (ii) coordinate transition of the UE from being served with standalone 4G connectivity by the 4G eNB 12 to being served instead with EN-DC cooperatively the 4G eNB 12 and the 5G gNB 14.

With inter-RAT handover, the 4G eNB 12 could engage in handover signaling with the 5G gNB 14 via an inter-access-node interface 38 (such as an X2 interface) to prepare the 5G gNB 14 to serve the UE. Further, the 4G eNB 12 could then transmit to the UE, in an RRC message, a release-and-direct command, releasing the UE's standalone 4G connection with the 4G eNB 12 and directing the UE to connect with the 5G gNB 12. Thus, in response to this release-and-redirect command, the UE could then discontinue being served by the 4G eNB 12 and could instead engage in processing as noted above for instance to acquire standalone 5G connectivity with the 5G gNB 14.

Because this inter-RAT handover process would result in the UE transitioning from having standalone 4G connectivity with the 4G eNB 12 to instead having standalone 5G connectivity with the 5G gNB 14, and because the 4G core network 20 serves UEs served with standalone 4G connectivity and the 5G core network 22 serves UEs having standalone 5G connectivity, the handover process will also result in the UE transitioning from being served by the 4G core network 20 to being served by the 5G core network 22. Namely, when the UE acquires standalone 5G connectivity with the 5G gNB 14, the UE could then engage in registration with the 5G core network 14 as noted above.

On the other hand, with inter-RAT dual connectivity, the 4G eNB 12 could maintain its 4G connection with the UE and could coordinate establishment for the UE of EN-DC service to be provided cooperatively by the 4G eNB 12 as MN and the 5G gNB 14 as SN. For instance, the 4G eNB 12 could engage in signaling with the UE and the 5G gNB 14 to coordinate setup for the UE of a secondary 5G connection with the 5G gNB 14. And the 4G eNB 12 could engage in signaling with the control-plane subsystem 30 of the 4G core network 12 and with the 5G gNB 14 to coordinate for the UE setup of a split bearer arrangement so that the 4G eNB 12 and 5G gNB 14 could then concurrently serve the UE each over their respective connection with the UE.

With this process, unlike with the inter-RAT handover process, the UE would remain served by the 4G core network 20. Namely, the UE's existing registration with the 4G core network 20 would remain, and both the 4G eNB 12 and the 5G gNB 14 would interoperate with the user-plane subsystem 26 of the 4G core network, likely with the 4G eNB 12 remaining as an anchor for core-network control signaling related to the EN-DC-connected UE.

In line with the discussion above, the UE in this scenario could select between the inter-RAT handover and the inter-RAT dual connectivity and could inform the 4G eNB 12 of the UE's selection so as to cause the 4G eNB 12 to operate accordingly. The UE could therefore control which of those two mechanisms the 4G eNB 12 would implement in response to the UE's B1 measurement report.

As discussed above, the UE could make this selection on various grounds, alone or in combination.

As one example, the UE could base the selection on an evaluation of the level of quality of service that the UE may experience if served by the 5G core network 22, such as based on an evaluation of the level of slice support that the 5G core network 22 could provide for the UE.

For instance, the UE may have earlier (e.g., recently) registered with the 5G core network 22, and during that 5G core-network registration process, may have learned from the control-plane subsystem 32 of the 5G core network 22 what slices the 5G core network 22 supports. Considering what applications are installed and/or running on the UE, the UE could thus predict what common set of slices the 5G core network 22 would support for the UE, such as what the result would be if the UE would engage in registration with the 5G core network as noted above.

And the UE could then determine whether that predicted set of slices would provide the UE with sufficiently high quality of service to justify the UE being served with standalone 5G connectivity by the 5G gNB 14 rather than being served with EN-DC service cooperatively by the 4G eNB 12 and the 5G gNB 14. If so, then the UE could select inter-RAT handover rather than inter-RAT dual connectivity. Whereas, if not, then the UE could select inter-RAT dual-connectivity rather than inter-RAT handover.

As another example, if the UE is battery powered, the UE could base the selection on an evaluation of the UE's remaining battery energy. For instance, the UE could apply a battery-energy-level monitor to determine the UE's remaining battery energy. And if the determined remaining battery energy is at least as low as a predefined threshold level, then the UE could select inter-RAT handover rather than inter-RAT dual connectivity, to help conserve the UE's battery energy. Whereas, if the determined remaining battery energy is higher than the predefined threshold level, then the UE could select inter-RAT dual connectivity.

Once the UE has made the selection, the UE could then inform the 4G eNB 12 of the UE's selection in various ways.

By way of example, when the UE transmits its B1 measurement report to the 4G eNB 12, the UE could include with the measurement report an information element that indicates the UE's selection of which of the mechanisms the 4G eNB 12 should apply, i.e., whether the 4G eNB 12 should (i) hand over the UE from standalone 4G connectivity with the 4G eNB 12 to standalone 5G connectivity with the 5G gNB 14 or rather (ii) coordinate transition of the UE from having standalone 4G connectivity with the 4G eNB 12 to having EN-DC cooperatively with the 4G eNB 12 and the 5G gNB 14. The 4G eNB 12 could thus read that information element from the UE's B1 measurement report and could act accordingly. Namely, if the information element from the UE specifies that the 4G eNB 12 should apply the inter-RAT handover, then the 4G eNB 12 could responsively apply the inter-RAT handover, and if the information element from the UE specifies that the 4G eNB 12 should set up EN-DC for the UE, then the 4G eNB 12 could responsively set up EN-DC for the UE.

Alternatively, the UE could transmit to the 4G eNB 12 a separate control message that indicates the UE's selection. Thus, for instance, the UE could transmit to the 4G eNB 12 both the UE's B1 measurement report and also a separate control signal that indicates the UE's selection of whether the 4G eNB 12 should apply the inter-RAT handover or should rather coordinate setup of the inter-RAT dual connectivity. And the 4G eNB 12 could similarly act accordingly.

Figure 2:
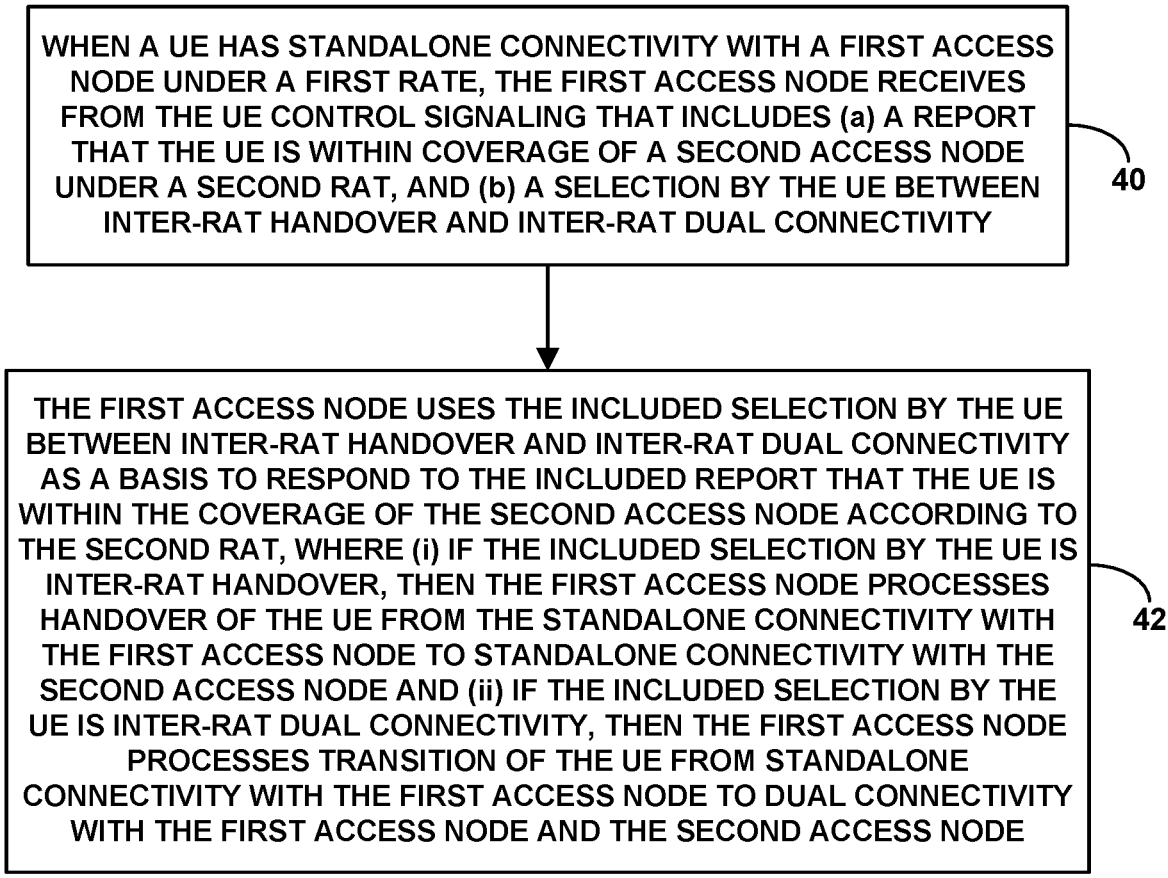
FIG. 2 is a flow chart depicting an example method in accordance with the disclosure.

FIG. 2 is next a flow chart depicting a method that could be carried out in accordance with the present disclosure, to control connectivity of a UE in a wireless communication system while the UE has standalone connectivity with a first access node under a first RAT.

As shown in FIG. 2, at block 40, the method includes the first access node receiving from the UE control signaling that includes (a) a report that the UE is within coverage of a second access node under a second RAT, and (b) a selection by the UE between inter-RAT handover and inter-RAT dual connectivity. And at block 42, the method includes the first access node then using the included selection by the UE between inter-RAT handover and inter-RAT dual connectivity as a basis to respond to the included report that the UE is within the coverage of the second access node according to the second RAT, where (i) if the included selection by the UE is inter-RAT handover, then the first access node processes handover of the UE from the standalone connectivity with the first access node to standalone connectivity with the second access node and (ii) if the included selection by the UE is inter-RAT dual connectivity, then the first access node processes transition of the UE from standalone connectivity with the first access node to dual connectivity with the first access node and the second access node.

In line with the discussion above, the act of receiving the signaling from the UE could involve receiving a single signaling message that carries both the report and the selection. For instance, the single signaling message could comprise a B1 measurement report. Alternatively, the act of receiving the signaling from the UE could involve receiving separate signaling messages, one carrying the report, and another carrying the selection.

Further, as discussed above, the act of processing handover of the UE from the standalone connectivity with the first access node to the standalone connectivity with the second access node could involve engaging in signaling with the second access node to prepare the second access node for the handover and then engaging in signaling with the UE to direct the UE to transition from being connected with the first access node to being connected instead with the second access node.

Still further, as discussed above, the UE may have a primary connection with the first access node, in which case processing transition of the UE from the standalone connectivity with the first access node to the dual connectivity with the first access node and the second access node could involve engaging in signaling with the second access node and the UE to coordinate establishment for the UE of a secondary connection with the second access node.

And yet further, as discussed above, the first RAT could be 4G LTE, the second RAT could be 5G NR, and the dual connectivity could be EN-DC, among other possibilities.

Figure 3:
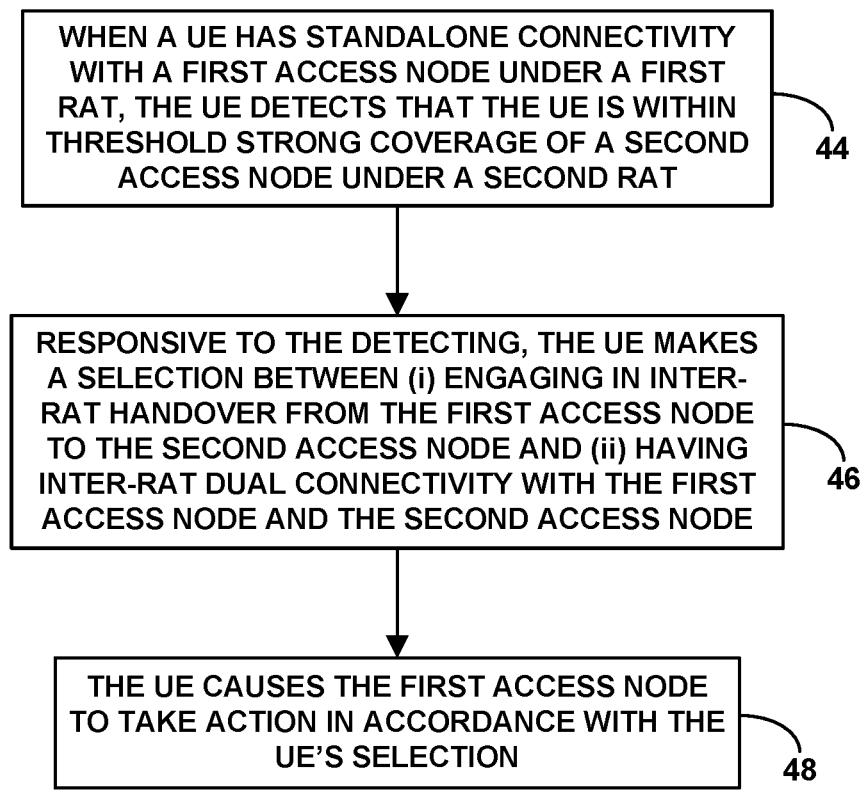
FIG. 3 is another flow chart depicting an example method in accordance with the disclosure.

FIG. 3 is next another flow chart depicting a method that could be carried out in accordance with the present disclosure, to control connectivity of a UE in a wireless communication system when the UE has standalone connectivity with a first access node under a first RAT.

As shown in FIG. 3, at block 44, the method includes the UE detecting that the UE is within threshold strong coverage of a second access node under a second RAT. Further, at block 46, the method includes, responsive to the detecting, the UE making a selection between (i) engaging in inter-RAT handover from the first access node to the second access node and (ii) having inter-RAT dual connectivity with the first access node and the second access node. And at block 48, the method includes the UE causing the first access node to take action in accordance with the UE's selection.

In line with the discussion above, the act of detecting that the UE is within threshold strong coverage of the second access node under the second RAT could involve measuring reference signal strength from the second access node and determining that the measured reference signal strength is at least as high as a predefined threshold level.

Further, as discussed above, while the UE has standalone connectivity withy the first access node, the UE is registered with a first core network rather than with a second core network. And the UE having the inter-RAT dual connectivity would maintain the UE being registered with the first core network rather than with the second core network, but the act of engaging in the inter-RAT handover would result in the UE being registered with the second core network rather than with the first core network. In that case, the act of UE making the selection could be based on slice support by the second core network, such as based on what levels of quality service support the second core network supports.

By way of example, making the selection could involve the UE determining the slice support of the second core network, such as determining the slice support based on previous registration by the UE with the second core network. And the act of making the selection based on the slice support of the second core network could involve determining whether the second core network supports slices for applications installed on the UE, such as quality of service levels that one or more such applications should optimally have. As an example of this, if the UE is running a voice-over-packet application, at issue could be whether the second core network would support a low-latency and low-error slice that is deemed optimal supporting voice-over-packet communication.

Still further, as discussed above, the act of the UE making the selection could be based on remaining battery energy of the UE. For instance, (i) the UE could determine whether its remaining battery energy is at least as low as a predefined threshold level, (ii) if the determination is affirmative, then, based at least on the determination, the UE could select the inter-RAT handover rather than the inter-RAT dual connectivity and (iii) if the determination is negative, then, based at least on the determination, the UE could select the inter-RAT dual connectivity rather than the inter-RAT handover.

Yet further, as discussed above, the act of causing the first access node to take action in accordance with the UE's selection could involve the UE transmitting to the first access node control signaling that includes an indication of the UE's selection. For instance, the control signaling could comprise a measurement report responsive to the detecting that the UE is within threshold strong coverage of the second access node under the second RAT, and the control signaling could carry the indication of the UE's selection.

Various features discussed above can be implemented in this context as well, and vice versa.

Figure 4:
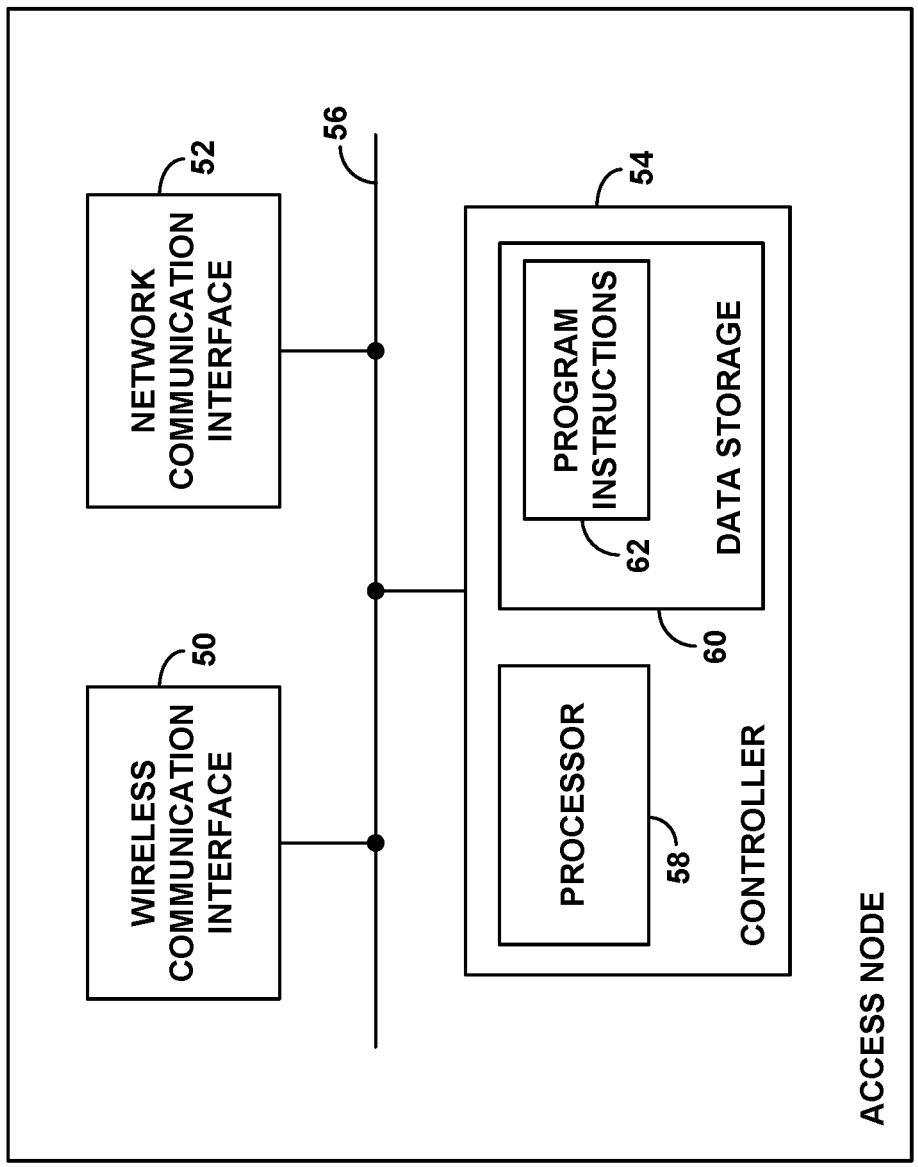
FIG. 4 is a simplified block diagram of an example access node operable in accordance with the disclosure.

FIG. 4 is next a simplified block diagram of an example access node that could be operable in accordance with the present disclosure carry out various operation as discussed above. As shown in FIG. 4, the example access node includes a wireless communication interface 50, a backhaul communication interface 52, and a controller 54, all of which could be integrated together and/or communicatively linked together by a system bus, network, or other connection mechanism 56.

In an example implementation, the wireless communication interface 50 could comprise an antenna structure, which could be tower mounted or could take other forms, and associated components such as a power amplifier and a wireless transceiver, so as to facilitate providing coverage on one or more carriers and serving the UE over an air-interface connection between the UE and the access node. And the backhaul communication interface 52 could comprise network communication interface such as an Ethernet interface, through which the first access node could engage in backhaul communication with one or more other access nodes and with various core-network entities.

Further, the controller 54 could comprise at least one processor 58 (e.g., one or more general purpose processors and/or one or more specialized processors) programmed to cause the first access node to carry out various operations such as those discussed herein. For instance, the controller 54 could comprise at least one non-transitory data storage 60 (e.g., one or more magnetic, optical, or flash storage components, necessarily non-transitory) which could store program instructions 62 executable by the at least one processor to cause the first access node to carry out such operations.

Various other features discussed herein can be implemented in this context as well, and vice versa.

Figure 5:
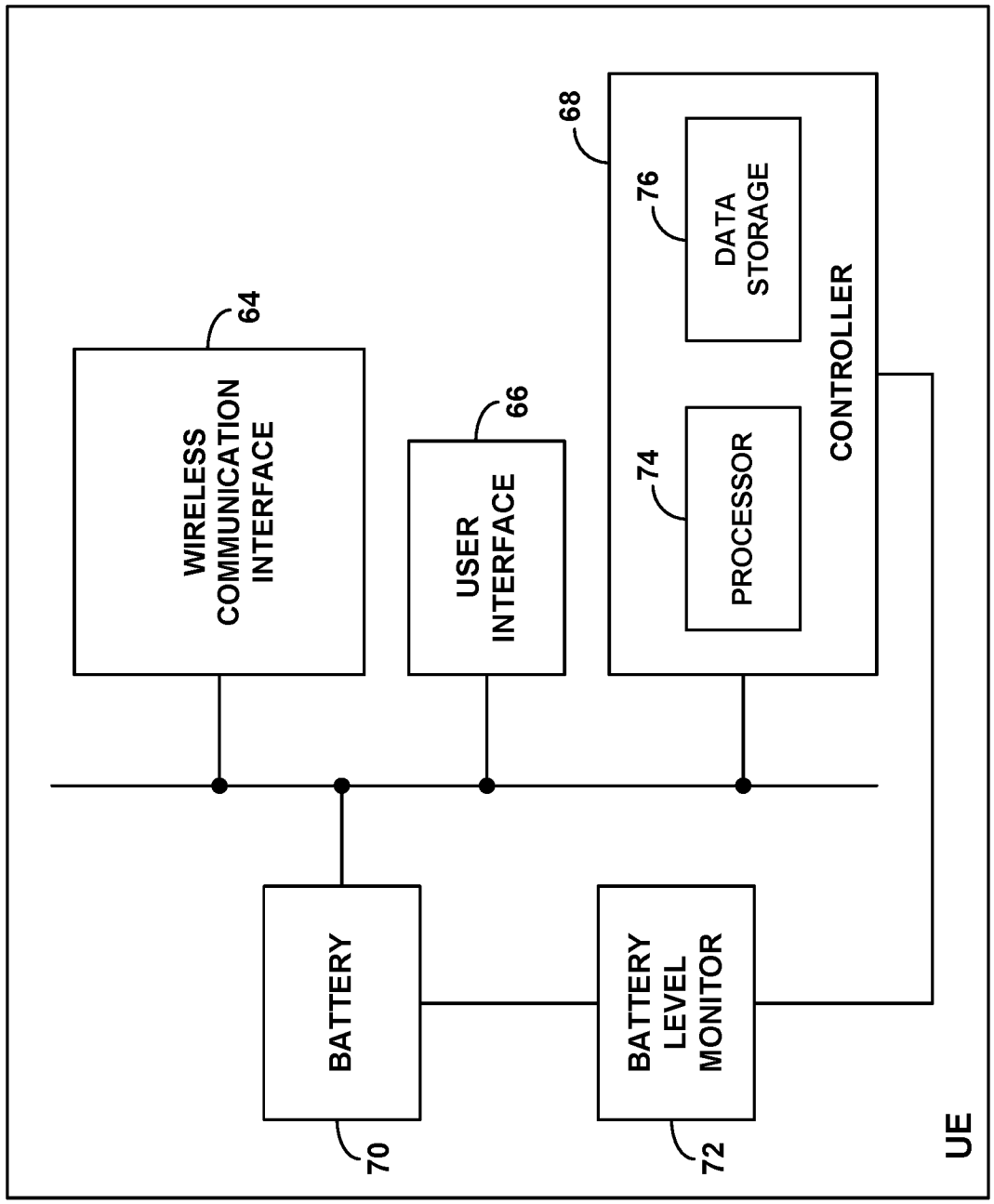
FIG. 5 is a simplified block diagram of an example UE operable in accordance with the disclosure.

Finally, FIG. 5 is a simplified block diagram of an example UE, showing some of the components that could be included to facilitate carrying out operations as described herein.

As shown in FIG. 5, the example UE includes a wireless communication interface 64, a user interface 66, a controller 68, a battery 70, and a battery level monitor 72. These components could be interconnected, integrated, and/or communicatively linked together in various ways now known or later developed. For simplicity, the figure generally depicts the battery 70 being interconnected with the wireless communication interface 64, user interface 66, and controller 68, and the figure generally depicts the battery level monitor 72 being interconnected with the battery 70 and the controller 68. Numerous other arrangements are also possible.

Wireless communication interface 64 could comprise modems and other RF circuitry enabling the UE to engage in air interface communication according to each of the various RATs as described above, separately or concurrently. And user interface 66, which could be included if the UE is user operated, could include input and output components to facilitate interaction with a user. For instance, the user interface could include analog-to-digital conversion circuitry and could include input components such as a touch screen, microphone, and keypad, and output components such as a display screen and sound speaker.

Controller 68, which could be integrated with wireless communication interface 64 (e.g., on a common chipset) or provided in another manner could operate to carry out or cause the UE to carry out various UE operations described herein. As shown, controller 68 could include at least one processor 74 (e.g., one or more general purpose processors such as microprocessors and/or one or more special purpose processors such as application specific integrated circuits), and at least one non-transitory data storage 76 (e.g., one or more volatile and/or non-volatile storage components, such as magnetic, optical and/or flash storage). And the at least one non-transitory data storage 76 could store program instructions (not shown), which could be executable by the at least one processor 74 to cause the UE to carry out the various UE operations.

Battery 70 could be configured to provide energy to support operation of the example UE when the example UE is not connected with another energy source, and the battery could be rechargeable. Further, the battery 68 could take various forms, examples of which include nickel metal hydride (NiMH), nickel cadmium (NiCd), Lithium Ion (Li-Ion), and lithium polymer (Li-Poly), or others now known or later developed. In addition, battery level monitor 72 could operate to regularly monitor the remaining battery energy level of battery 70 and to provide an output signal indicating a latest determined remaining battery energy level. As such, battery level monitor 72 could take various forms as discussed above, such as a voltmeter or a coulomb counter, among other possibilities. Further, the battery level monitor 72 could be integrated with the battery 70 itself or could be provided separately and interconnected with the battery.

Various features described above can be carried out in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for dynamically controlling connectivity of a user equipment device (UE) in a wireless communication system while the UE has standalone connectivity with a first access node under a first radio access technology (RAT), the method comprising:
receiving by the first access node, from the UE, control signaling that includes (a) a report that the UE is within coverage of a second access node under a second RAT, and (b) a selection by the UE between inter-RAT handover and inter-RAT dual connectivity; and
using by the first access node the included selection by the UE between inter-RAT handover and inter-RAT dual connectivity as a basis to respond to the included report that the UE is within the coverage of the second access node according to the second RAT, wherein (i) if the included selection by the UE is inter-RAT handover, then the first access node processes handover of the UE from the standalone connectivity with the first access node to standalone connectivity with the second access node and (ii) if the included selection by the UE is inter-RAT dual connectivity, then the first access node processes transition of the UE from standalone connectivity with the first access node to dual connectivity with the first access node and the second access node.

2. The method of claim 1, wherein receiving the signaling from the UE comprises receiving a single signaling message that carries both the report and the selection.

3. The method of claim 2, wherein the signaling message comprises a B1 measurement-report.

4. The method of claim 1, wherein receiving the signaling from the UE comprises receiving separate signaling messages, one carrying the report, and another carrying the selection.

5. The method of claim 1, wherein processing handover of the UE from the standalone connectivity with the first access node to the standalone connectivity with the second access node comprises engaging in signaling with the second access node to prepare the second access node for the handover and then engaging in signaling with the UE to direct the UE to transition from being connected with the first access node to being connected instead with the second access node.

6. The method of claim 1, wherein the UE has a primary connection with the first access node, and wherein processing transition of the UE from the standalone connectivity with the first access node to the dual connectivity with the first access node and the second access node comprises engaging in signaling with the second access node and the UE to coordinate establishment for the UE of a secondary connection with the second access node.

7. The method of claim 1, wherein the first RAT is 4G Long Term Evolution (4G LTE), the second RAT is 5G New Radio (5G NR), and the dual connectivity is EUTRA-NR Dual Connectivity (EN-DC).

8. A method for dynamically controlling connectivity of a user equipment device (UE), the method comprising:
when the UE has standalone connectivity with a first access node under a first radio access technology (RAT), (a) detecting by the UE that the UE is within threshold strong coverage of a second access node under a second RAT and (b) responsive to the detecting, making a selection by the UE between (i) engaging in inter-RAT handover from the first access node to the second access node and (ii) having inter-RAT dual connectivity with the first access node and the second access node; and
causing by the UE the first access node to take action in accordance with the UE's selection,
wherein, while the UE has standalone connectivity with the first access node, the UE is registered with a first core network rather than with a second core network, wherein having the inter-RAT dual connectivity will maintain the UE being registered with the first core network rather than with the second core network, and wherein engaging in the inter-RAT handover will result in the UE being registered with the second core network rather than with the first core network, and
wherein making the selection by the UE is based on slice support of the second core network.

9. The method of claim 8, wherein detecting that the UE is within threshold strong coverage of the second access node under the second RAT comprises measuring reference signal strength from the second access node and determining that the measured reference signal strength is at least as high as a predefined threshold level.

10. The method of claim 8, wherein making the selection by the UE comprises determining by the UE the slice support of the second core network, wherein the determining is based on previous registration by the UE with the second core network.

11. The method of claim 8, wherein making the selection by the UE based on slice support of the second core network comprises determining by the UE whether the second core network supports slices for applications installed on the UE.

12. The method of claim 8, wherein making the selection by the UE is further based on remaining battery energy of the UE.

13. The method of claim 12, wherein making the selection by the UE based on remaining battery energy of the UE comprises (i) making a determination of whether the remaining battery energy of the UE is at least as low as a predefined threshold level, (ii) if the determination is affirmative, then, based at least on the determination, selecting by the UE the inter-RAT handover rather than the inter-RAT dual connectivity and (iii) if the determination is negative, then, based at least on the determination, selecting by the UE the inter-RAT dual connectivity rather than the inter-RAT handover.

14. The method of claim 8, wherein causing the first access node to take action in accordance with the UE's selection comprises transmitting from the UE to the first access node control signaling that includes an indication of the UE's selection.

15. The method of claim 14, wherein the control signaling comprises a measurement report responsive to the detecting that the UE is within threshold strong coverage of the second access node under the second RAT, wherein the control signaling carries the indication of the UE's selection.

16. The method of claim 8, wherein the first RAT is 4G Long Term Evolution (4G LTE), the second RAT is 5G New Radio (5G NR), and the dual connectivity is EUTRA-NR Dual Connectivity (EN-DC).

17. A user equipment device (UE) configured to control connectivity, wherein the UE comprises:
at least one processor;
at least one non-transitory data storage; and
program instructions stored in the non-transitory data storage and executable by the at least one processor to cause the UE to carry out operations, the operations including:

when the UE has standalone connectivity with a first access node under a first radio access technology (RAT), (a) detecting that the UE is within threshold strong coverage of a second access node under a second RAT, and (b) responsive to the detecting, making a selection between (i) the UE engaging in inter-RAT handover from the first access node to the second access node and (ii) the UE having inter-RAT dual connectivity with the first access node and the second access node; and causing the first access node to take action in accordance with the UE's selection, wherein making the selection by the UE is based on remaining battery energy of the UE, and wherein making the selection by the UE based on remaining battery energy of the UE comprises (i) making a determination of whether the remaining battery energy of the UE is at least as low as a predefined threshold level, (ii) if the determination is affirmative, then, based at least on the determination, selecting by the UE the inter-RAT handover rather than the inter-RAT dual connectivity and (iii) if the determination is negative, then, based at least on the determination, selecting by the UE the inter-RAT dual connectivity rather than the inter-RAT handover.

18. The UE of claim 17, wherein, while the UE has standalone connectivity with the first access node, the UE is registered with a first core network rather than with a second core network, wherein having the inter-RAT dual connectivity will maintain the UE being registered with the first core network rather than with the second core network, and wherein engaging in the inter-RAT handover will result in the UE being registered with the second core network rather than with the first core network, and wherein making the selection is further based on slice support of the second core network.

19. The UE of claim 18, wherein making the selection comprises determining the slice support of the second core network, wherein the determining is based on previous registration by the UE with the second core network.

* * * * *